2,828,298
Patented Mar. 25, 1958

2,828,298
BLOWING AGENTS

William H. von Glahn, Loudonville, N. Y., and Bernard Rudner, Baltimore, Md., assignors to General Aniline & Film Corporation, New York, N. Y., a corporation of Delaware No Drawing. Application December 30, 1955
Serial No. 556,417

7 Claims. (Cl. 260—140)

This invention relates to novel chemical compounds and, more particularly, is concerned with compounds containing both a diazoamine grouping and either an acyl azide or an acyl hydrazide group.

The novel compounds embodied in this invention are relatively stable at normal temperatures, but may be decomposed with evolution of nitrogen gas at elevated temperatures and are thus of interest as "blowing" agents for the production of foamed resins, or in explosives (particularly, as explosion initiators). These novel compounds may be represented by the following general formula:

$$\text{Aryl}-N=N-\overset{R}{\underset{|}{N}}-W-(ZX)_n$$

wherein R represents hydrogen or lower (i. e., 1 to 4 carbon atoms) alkyl; W represents phenylene or alkylene (1 to 3 carbon atoms); Z represents an acyl group, i. e., —CO— or —SO$_2$—; and X represents a hydrazine (—NHNH$_2$) or a triazyl

and $n$ represents 1 or 2; and Aryl represents an aryl radical which may also include simple substituents or may be an aryl radical of the type

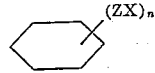

wherein Z, X and $n$ are as defined above.

The combination in a single molecule of both a diazoamine grouping and either an acyl azide or acyl hydrazide group, is believed to constitute a novel concept of chemical compounds of special value for use as "blowing" agents for rubber, and the like; or in explosives (particularly, as explosion initiators). While the combination of these two types of groups, in a single molecule, is novel, the groups, themselves, are well known in the art, as is the synthesis of compounds containing only one of these groups. It has been found that the novel compounds embodied in the concept of the present invention can be prepared by suitably combining methods for preparing aromatic compounds containing diazoamine groups, and methods for preparing compounds containing an acyl azide or acyl hydrazide grouping. Complete details of the synthesis of these novel compounds are given in the specific examples, which form a part of the present specification.

Due to the potentially explosive character of the products of the present invention, suitable precaution should be observed in preparing these novel compounds, and in handling and testing the same. Similar precautions are generally indicated, and should be applied, as are employed in the manufacture of other organic compounds of explosive nature; such as, trinitrotoluene, picric acid, nitroglycerine, etc.

The synthetic procedures, which have been found to be feasible, for the preparation of these novel compounds, are illustrated in the specific examples given below, and may be summarized as follows:

An aromatic amine is diazotized (for example to the diazoniumchloride) in the usual manner. If a compound containing both a diazoamino and an acyl azide group is desired, the thus prepared diazo is then condensed, under mildly alkaline conditions, with a primary or secondary aliphatic or aromatic amine, containing an acyl azide grouping. This condensation proceeds readily on mixing solutions of the two components, and the desired product may be recovered by filtration, purified and dried. However, if a compound containing both a diazoamino group and an acyl hydrazide group is desired, it is preferable to condense the diazo compound with an amino substituted phenylene or alkylene carboxylic acid, the acyl group of which has been protected as by ester formation. This condensation proceeds readily and the desired product containing both a diazoamino and an acyl hydrazide group may be obtained by treating the thus obtained diazoamino compound with hydrazine hydrate solution. In case a product containing a sulfonhydrazide group is desired, it is preferable to then condense the diazo compound with an amino benzene sulfonhydrazide obtained for example by condensing an acetamidobenzene sulfonyl chloride with hydrazine followed by splitting off of the acetyl group to produce the amino benzene sulfonyl hydrazide. Variations of these methods may be used where feasible. The details of the synthesis of the products of the present invention will be apparent from consideration of the following specific examples:

EXAMPLE 1

(A) To 245 g. p-aminobenzhydrazid (1.62 mole), 600 cc. water and 500 cc. hydrochloric acid 20° Bé. at 0° C. is added below the surface 3.24 mols concentrated sodium nitrite solution at 0–5° C. Excess nitrite is maintained for ½ hour, then the excess of nitrite is destroyed.

(B) To 245 g. p-aminobenzhydrazid (1.62 mols) 600 cc. water, and 180 g. glacial acetic acid at 0° C. is added below the surface 1.62 mols of sodium nitrite as a concentrated solution at 0–5° C.

A, at 0–5° C., was added to B and then sufficient sodium hydroxide was added to render the solution alkaline to Brilliant Yellow. The precipitation product is filtered off, reslurried in water, filtered, water washed and air dried. 361 g. light brown dry material was obtained.

The reaction follows the equation:

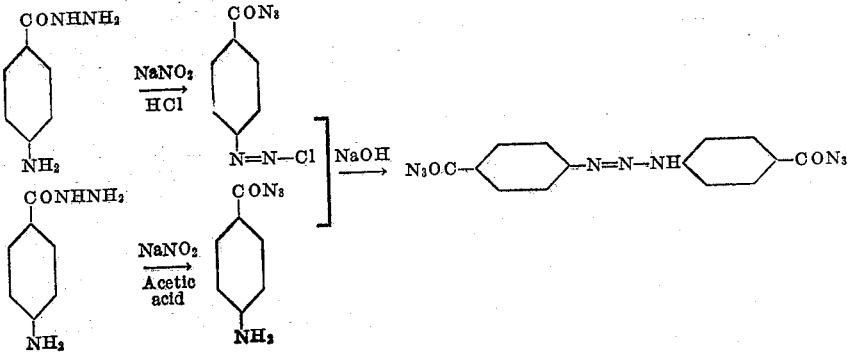

This compound can be prepared in a different manner. See Example VIII and Example IX, Table I.

EXAMPLE 2

When in Example 1 the p-aminobenzhydrazid is replaced with o-aminobenzhydrazid the corresponding o-compound is obtained.

The overall reaction is as follows:

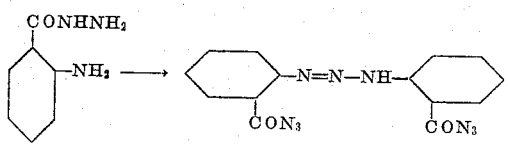

EXAMPLE 3

14 g. o-anisidine-4-sulfonhydrazide (0.064 mol) in 200 cc. water and 15 cc. HCl 20° Bé. are diazotized at 0–5° C. with 7 g. NaNO₂ as a concentrated solution. After stirring well, the charge is made slightly alkaline by addition of an excess of sodium bicarbonate. The charge is stirred at 0–5° C. until the condensation is completely filtered, washed and air dried.

The overall reaction is as follows:

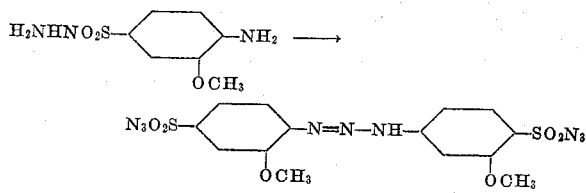

EXAMPLE 4

6.9 g. p-nitroaniline in 100 cc. water and 12.5 cc. HCl 20° Bé. are diazotized at 0–5° C. with 3.5 g. sodium nitrite as a concentrated solution. After diazotization is complete, the charge is stirred into 8.1 g. p-aminobenzazide in 100 cc. water. After stirring for about 5 minutes the charge is made alkaline with sodium carbonate. The deep yellow crystals are filtered, washed well and air dried.

The reaction follows the general equation:

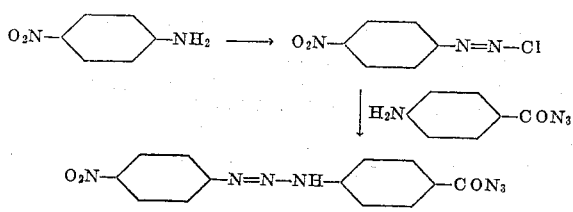

EXAMPLE 5

46.5 g. aniline in 500 cc. water and 125 cc. HCl (36.5% by vol.) at 0–5° C. are diazotized with 34.5 g. sodium nitrite as a concentrated solution. After addition of the nitrite, the charge is stirred well for ½ hr. The charge is clarified by treatment with activated charcoal and filtered. The excess nitrite is then destroyed. To this is added 82.5 g. ethyl p-aminobenzoate in 200 cc. water, the charge stirred for 5 minutes, and made Brilliant Yellow alkaline with sodium carbonate. The charge is stirred for ½ hr., filtered, washed well and air dried.

To a flask equipped with agitator, thermometer and reflux condenser is added 13.5 g. of the above product. 17 cc. hydrazine hydrate (85%) is added, the charge refluxed for 24 hours, cooled to room temperature, diluted with 17 cc. ethanol, cooled to 15° C., filtered, washed with cold water and air dried.

The reaction follows the general equation:

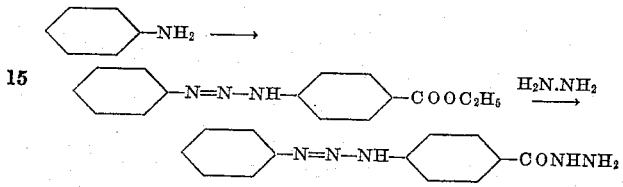

EXAMPLE 6

.1 mol. p-acetamidosulfon chloride is condensed as usual with hydrazine to form p-acetamidobenzenesulfon hydrazide. The acetyl group of this compound is then split off by heating in aqueous sodium carbonate solution to form p-aminobenzenesulfon hydrazide.

The diazonium compound from .1 mol aniline is condensed at 0–5° C. with .1 mol of the above hydrazide in soda ash alkaline solution. The thus obtained condensation product is neutralized, filtered and washed with cold water.

The reaction is as follows:

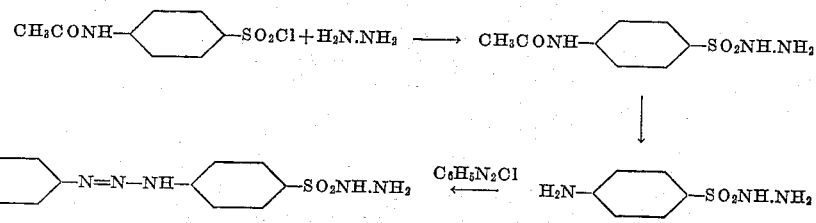

EXAMPLE 7

Example 5 was repeated employing, instead of ethyl p-aminobenzoate, ethyl N-methyl-p-aminobenzoate. A product is obtained of the probable formula:

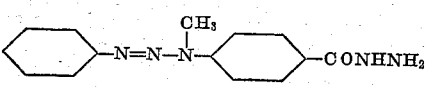

While the novel compounds of the type described in the foregoing examples are, particularly, preferred, in which group W, in the general formula given above, is phenylene, and which, as indicated, may be obtained by condensing an aryl diazonium chloride with an aminobenzhydrazide, or aminobenzazide, or an aromatic aminosulfonhydrazide, or azide, it has been found that, in place of the aromatic aminohydrazide and azides, hydrazides and azides derived from aliphatic amines may be employed, if desired. The synthesis of such compounds is illustrated by the following specific examples:

EXAMPLE 8

6.9 g. (0.051 mol) p-nitroaniline in 100 cc. water and 12.5 cc. HCl 20° Bé., are diazotized at 0–5° C. with 3.5 g. sodium nitrite as a concentrated solution. After diazotization is complete, the charge is stirred into 4.6 g. ethyl sarcoside in 200 cc. water and 21 g. sodium carbonate at 0° C. The addition is made slowly, maintaining a slight alkalinity to phenolphthalein. The charge is filtered and washed with cold water. It is then treated with hydrazine hydrate in a manner similar to Example 5. The reaction follows the general equation:

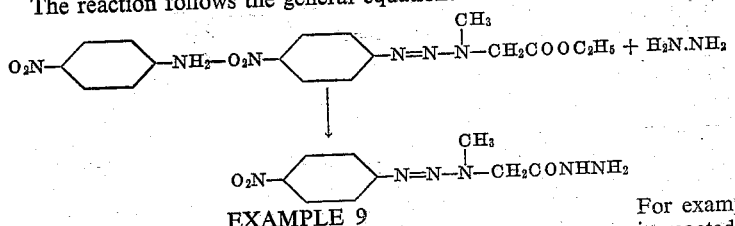

EXAMPLE 9

12.8 g. of the product of Example 8 is treated with 200 cc. water at 0–5° C. and 25 cc. HCl (36.5% by vol.) 4 g. sodium nitrite, as a 31.5% solution, is added to the solution. After reaction is complete, the charge is made alkaline to Brilliant Yellow. The material is filtered, washed and dried. The reaction is as follows:

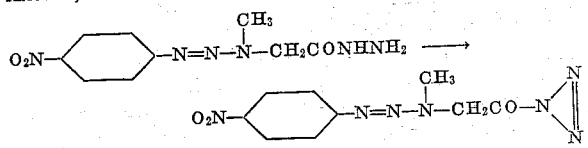

As indicated, the procedure described in the foregoing examples is a preferred method for the synthesis of the novel compounds of the present invention containing both a diazoamino grouping and an acyl hydrazide or acyl azide grouping; and there is illustrated, in tabular form below (Table I), a variety of other specific compounds embodied in the present invention which may be prepared by the foregoing procedure, using, in place of the specific diazonium chloride, employed in the foregoing examples, an equivalent amount of the diazoniumchloride indicated in column A of the table; and/or an equivalent amount of (a) the amino alkylene or phenylene azide, or (b) the amino alkylene or phenylene carboxylic or sulfonic acid ester indicated in column B of the table, in place of the amino aryl hydrazides employed in the foregoing Examples 1 to 3; or the aryl azide employed in Example 4; or the amino aryl ester employed in Examples 5 to 7, respectively:

In the above preparations, it has been found advantageous to vary the general methods in several cases.

For example, in the case of Example III, the diazonium is reacted with the aminophenylenecarboxylic ester and this ester then converted to the hydrazide. In Examples VIII and IX, the diazoamino should be formed first followed by conversion to the hydrazide (Example VIII) or the azide (Example IX).

The novel products described above are, as stated, relatively suitable at normal temperatures, but may be decomposed under normal conditions at elevated temperatures; and are, therefore, of particular interest for the production of foam plastics. A number of the foregoing products have been tested as "blowing" agents for rubber, in the manner described in the following example:

EXAMPLE 10

The following rubber compositions were made up by combining the ingredients listed below, in the usual manner, on a rubber mill, at a temperature of 70 to 80° F., until a homogeneous mass is formed; i. e., by milling from about 15 minutes to three hours:

| | Grams |
|---|---|
| Pale crepe rubber | 259.5 |
| Blanc fixe | 169.5 |
| Whiting | 90.0 |
| Zinc oxide | 30.0 |
| Sulfur | 6.0 |
| 90% rubber +10% benzodithiazyl disulfide | 37.5 |
| 90% rubber +10% zinc dimethyldithiocarbamate | 7.5 |
| Titanium dioxide | 24.0 |

It is to be understood that the foregoing rubber formulation is illustrative only, and may be varied considerably.

Table I

| Example | A Diazoniumchloride | B Aminoalkylene or Phenylene Hydrazide or Ester | C Product |
|---|---|---|---|
| I | ⬡—N=N—Cl | H₂N—⬡—SO₂N₃ | ⬡—N=N—NH—⬡—SO₂N₃ |
| II | N₃OC—⬡—N=NCl | H₂N—⬡—CO—N₃ | N₃OC—⬡—N=N—NH—⬡—CON₃ |
| III | ⬡—N=NCl | H₂N—⬡—COOC₂H₅ | ⬡—N=N—NH—⬡—CONHNH₂ |
| IV | O₂N—⬡—N=N—Cl | CH₃NHCH₂CON₃ | O₂N—⬡—N=N—N(CH₃)CH₂CON₃ |
| V | ⬡—N=N—Cl | CH₃NHCH₂CH₂SO₂N₃ | ⬡—N=N—N(CH₃)CH₂CH₂SO₂N₃ |
| VI | ⬡—N=N—Cl | CH₃NHCH₂CH₂SO₃C₂H₅ | ⬡—N=N—N(CH₃)CH₂CH₂SO₂NHNH₂ |
| VII | Cl—⬡—N=NCl | H₂N—⬡—SO₂N₃ | Cl—⬡—N=N—NH—⬡—SO₂N₃ |
| VIII | H₃COOC—⬡—N=NCl | H₂N—⬡—COOCH₃ | H₂NNHOC—⬡—N=N—NH—⬡—CONHNH₂ |
| IX | H₃COOC—⬡—N=N—Cl | H₂N—⬡—COOCH₃ | N₃OC—⬡—N=NNH—⬡—CON₃ |

It was selected only as a satisfactory and typical medium, in which to test the compounds of this invention as "blowing" agents. This testing was carried out as follows:

To 100 parts of the thus obtained rubber composition, there was then added three parts, by weight, of the product of the present invention, which it was desired to test as a "blowing" agent. The rubber composition and the "blowing" agent were milled at 70 to 80° F. until well mixed; i. e., 15 minutes to several hours. The thus obtained rubber and "blowing" agent mixture was then placed in a dry oven, at about 220° F. for 15 minutes to several hours, so as to obtain a vulcanized "foamed" product. Using 3%, by weight, based on the amount of rubber tested, the following results were obtained with the test carried out with the products of the foregoing specific examples noted below:

The product of Example 1 was fairly active as a "blowing" agent, formed small pores, and the color was a bright brown.

The product of Example 2 was fairly active as a "blowing" agent, formed small pores, and the color was a cream color.

The product of Example 3 was moderately active as a "blowing" agent, formed small pores, and was a pinkish tan in color.

The product of Example 4 was moderately active as a "blowing" agent, formed small pores, and was yellowish tan in color.

We claim:

1. Compounds of the formula

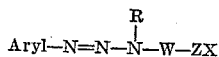

wherein aryl represents an aryl group of the benzene series, R represents a member of the group consisting of hydrogen and lower alkyl groups of 1 to 4 carbon atoms; W represents a member of the group consisting of phenylene radicals and alkylene radicals of 1 to 3 carbon atoms; Z represents a member of the group consisting of —CO— and —SO$_2$—; and X represents a member of the group consisting of hydrazino and azide groups.

2. Compounds of the formula

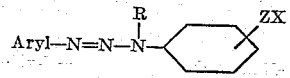

wherein aryl represents an aryl group of the benzene series, R represents a member of the group consisting of hydrogen and lower alkyl groups of 1 to 4 carbon atoms; Z represents a member of the group consisting of —CO— and —SO$_2$—; and X represents a member of the group consisting of hydrazino and azido groups.

3. Compounds of the formula

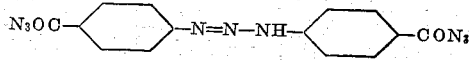

4. Compounds of the formula

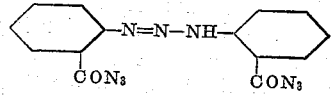

5. Compounds of the formula

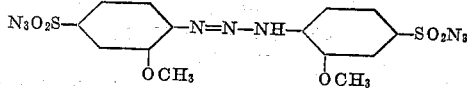

6. Compounds of the formula

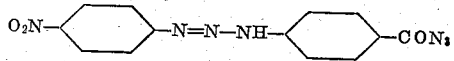

7. Compounds of the formula

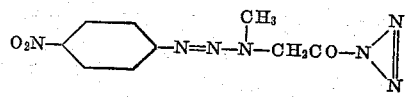

References Cited in the file of this patent

UNITED STATES PATENTS

| Number | Name | Date |
|---|---|---|
| 2,133,037 | Moyer | Oct. 11, 1938 |
| 2,308,675 | Clingestein et al. | Jan. 19, 1943 |
| 2,518,249 | Ott | Aug. 8, 1950 |
| 2,673,197 | Jensch | Mar. 23, 1954 |
| 2,741,624 | Hunter | Apr. 10, 1956 |